(12) United States Patent
Watanabe et al.

(10) Patent No.: US 7,143,732 B2
(45) Date of Patent: Dec. 5, 2006

(54) IDLING STOP CONTROL APPARATUS

(75) Inventors: Kunitoshi Watanabe, Utsunomiya (JP); Takashi Namari, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/176,357

(22) Filed: Jul. 8, 2005

(65) Prior Publication Data
US 2006/0011163 A1 Jan. 19, 2006

(30) Foreign Application Priority Data
Jul. 15, 2004 (JP) ............... 2004-208571

(51) Int. Cl.
F02D 29/02 (2006.01)
F02D 11/10 (2006.01)
(52) U.S. Cl. .................................. 123/179.4
(58) Field of Classification Search ............. 123/179.3, 123/179.4
See application file for complete search history.

(56) References Cited

U.S. PATENT DOCUMENTS

2005/0066943 A1 * 3/2005 Tanaka et al. ............. 123/491
2005/0139182 A1 * 6/2005 You ........................ 123/179.4

FOREIGN PATENT DOCUMENTS

JP 2000289454 A * 10/2000
JP 2002-235574 8/2002

* cited by examiner

Primary Examiner—Stephen K. Cronin
Assistant Examiner—Arnold Castro
(74) Attorney, Agent, or Firm—Squire, Sanders & Dempsey L.L.P.

(57) ABSTRACT

An idling stop control apparatus includes a starter motor operation prohibiting device, an idling state determination device, an idling stop function determination device, a switch status determination device, an indicator, and an idling stop function rendering inoperative device. The idling stop function rendering inoperative device switches the idling stop function from an operative state to an inoperative state, when the idling state determination device determines that the internal combustion engine is running, and when the switch status determination device determines that the starter switch is turned on.

4 Claims, 4 Drawing Sheets

IDLING STOP CONTROL APPARATUS

BACKGROUND OF THE INVENTION

1. Field of the Invention

The present invention relates to an idling stop control apparatus.

Priority is claimed on Japanese Patent Application No. 2004-208571, filed on Jul. 15, 2004, the content of which is incorporated herein by reference.

2. Description of Related Art

Conventionally, for example, some two-wheeled motor vehicles are provided with an idling stop control apparatus to stop an engine when waiting for a signal and when in a traffic jam, in order to suppress the discharge of exhaust gas and fuel consumption. In many cases, the idling stop control apparatus re-starts the engine due to a predetermined operation such as normally switching on an accelerator or releasing the brake. Further, there is an idling stop control apparatus that is provided with a special switch for making operative or inoperative a function of controlling to carry out an idling stop (hereinafter called an idling stop function). The unit effects an intention of an occupant, who may not intend to perform idling stop control, onto the idling stop control, thereby improving value (For example, refer to Japanese Unexamined Patent Application, First Publication No.2002-235574).

However, since the idling stop control apparatus is provided with a special switch for making the idling stop function operative or inoperative, there is a problem in that the number of components is increased, and resultantly the production cost is increased.

SUMMARY OF THE INVENTION

The present invention provides an idling stop control apparatus, in which the number of components is decreased, capable of decreasing production costs.

An idling stop control apparatus, equipped in an internal combustion engine, having an idling stop function, and being capable of switching the idling stop function to an operative state or an inoperative state, the idling stop control apparatus including: a starter motor operation prohibiting device which prohibits an operation of a starter motor when it is determined that the internal combustion engine is running; an idling state determination device which determines whether the internal combustion engine is idling; an idling stop function determination device which determines whether the idling stop function is in an operative state or in an inoperative state; a switch status determination device which determines a turning on operation of the starter switch; an indicator which gives an idling stop indication when the internal combustion engine shifts to an idling stop state; and an idling stop function rendering inoperative device which switches the idling stop function from an operative state to an inoperative state, when the idling state determination device determines that the internal combustion engine is running, and when the switch status determination device determines that the starter switch is turned on.

According to the present invention, it is possible to switch the idling stop function from an operative state to an inoperative state by utilizing the starter switch without providing a special switch exclusive for changing the status of the idling stop function. Therefore, since the number of components can be reduced by omission of the special switch, it is possible to reduce production costs.

It is preferable that the idling stop control apparatus of the present invention further include an idling stop function rendering operative device which switches the idling stop function from an inoperative state to an operative state, in a state where it is determined that the internal combustion engine is running and the operation of the starter motor is prohibited, when the idling stop function determination device determines that the idling stop function is in an inoperative state and when the switch status determination device determines that the starter switch is turned on.

According to the present invention, it is possible to switch the idling stop function from an inoperative state to an operative state by utilizing the starter switch without providing a special switch for changing the status of the idling stop function. Therefore, since the number of components can be reduced by omission of the special switch, it is possible to reduce production costs.

It is preferable that the idling stop control apparatus of the present invention further include an indicator turning off device which turns off the indicator when the idling stop function rendering inoperative device switches the idling stop function from an operative state to an inoperative state.

According to the present invention, since the indicator is turned off by the indicator turning off device, an occupant is capable of accurately recognizing that the present idling stop function is in an inoperative state, and it is possible for the occupant to select a status for the idling stop function according to his own intention. Therefore, it is possible to relieve burden on the occupant.

DETAILED DESCRIPTION OF THE INVENTION

Hereinafter, a description is given of an embodiment of the present invention based on the accompanying drawings.

Figure 1:
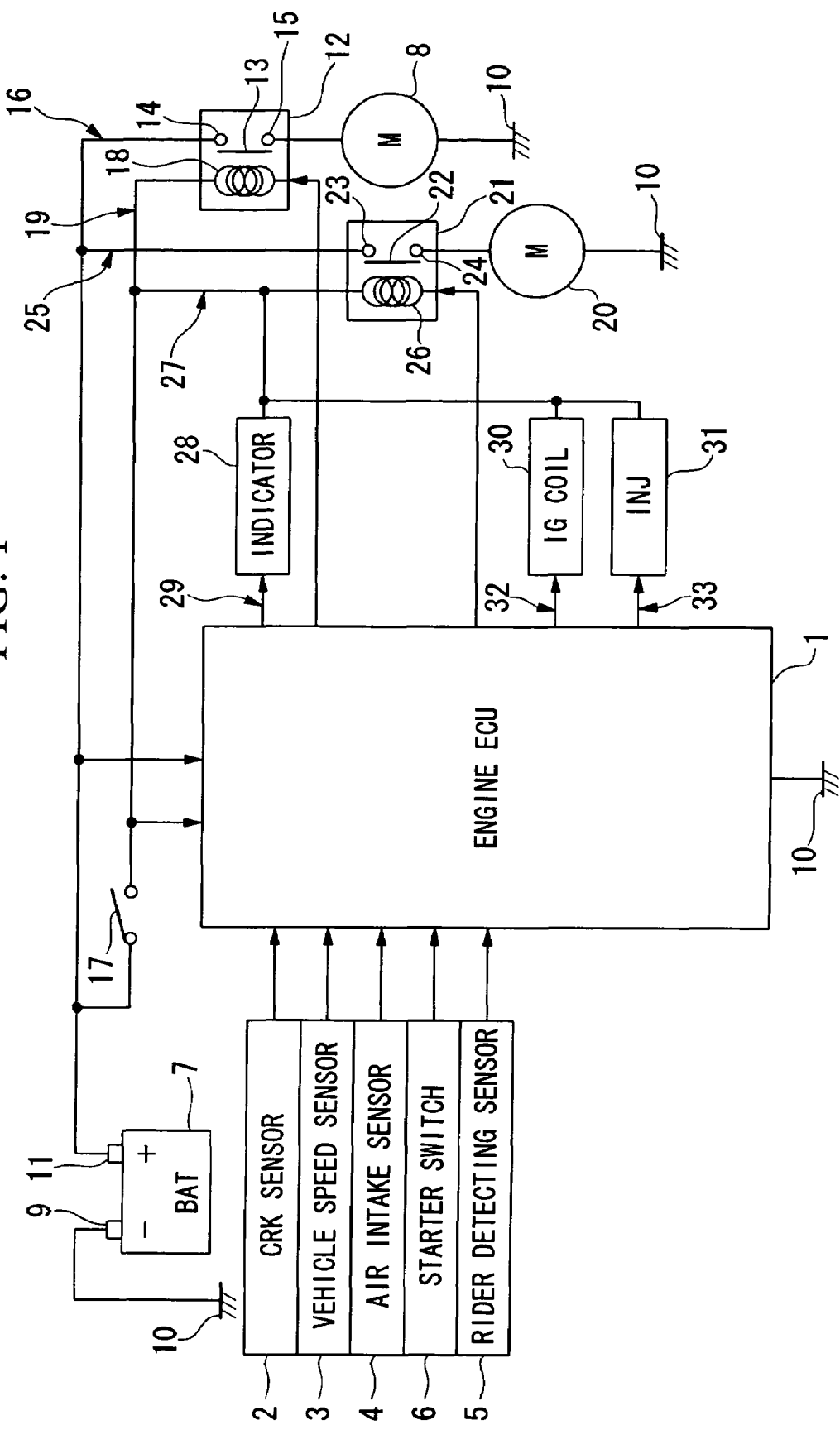
FIG. 1 is a circuit diagram showing an embodiment of an idling stop control apparatus according to the present invention.

FIG. 1 depicts an idling stop control apparatus of a two-wheeled motor vehicle such as, for example, a motor scooter. The idling stop control apparatus is provided with an electronic control unit (Engine ECU) 1.

The two-wheeled motor vehicle carries out an idling stop, which is an automatic stop of the engine, if predetermined stop permission conditions are satisfied and an idling state is continued for a fixed duration of time. Further, for example, if a resetting condition is satisfied by a re-starting operation such as, for example, operation of an accelerator, the engine starts. Herein, "idling stop" means that the engine stops ignition and fuel injection stops.

A crankshaft angle (CRK) sensor 2, a vehicle speed sensor 3 for detecting vehicle speed, an air intake pressure sensor 4 for detecting air intake pressure of the engine, and a rider detecting sensor 5 for detecting that a rider is in the vehicle are connected to the electronic control unit 1. Detection signals of these types of sensors are inputted into the electronic control unit 1. The electronic control unit 1 determines, on the basis of a detection result of the crankshaft angle sensor 2, whether or not the engine is idling. Also, the electronic control unit 1 determines, on the basis of a detection result of the vehicle speed sensor 3, whether or not the two-wheeled motor vehicle has stopped. Further, the electronic control unit 1 determines, on the basis of a detection result of the air intake pressure sensor 4, whether not the engine is running.

A starter switch 6 that is operated by a rider to start the engine is connected to the electronic control unit 1. The starter switch 6 usually is in an off state, and maintains an on state only while the rider is carrying out a turning on operation. The electronic control unit 1 carries out a turning on operation of the starter switch and carries out an idling stop control process described later on the basis of detection results of the respective types of sensors described above.

A battery (BAT) 7 is incorporated in the two-wheeled motor vehicle described above. The electronic control unit 1 is connected to the plus (positive) side terminal 11 of the battery 7, the output side of the key switch 17 connected thereto, and ground 10. That is, power is supplied from the battery 7 to the electronic control unit 1, and at the same time, voltage signal is of on and off operations of the key switch 17 are inputted thereinto.

The battery 7 supplies power to a starter motor (M) 8, etc., for cranking the engine in addition to the electronic control unit 1. The minus (negative) side terminal 9 of the battery 7 is wired to a so-called minus earth connected to the ground 10. The ground 10 is a frame earth of the two-wheeled motor vehicle, and respective closed circuits described later are connected to the minus side terminal 9 of the battery 7 via the ground 10.

An input terminal 14 of the contact 13 of the starter relay 12 to actuate the starter motor 8 is connected to the plus side terminal 11 of the battery 7. The starter motor 8 is connected to the output terminal 15 of the contact 13, and the ground 10 is connected to the starter motor 8. The first closed circuit 16 is composed of the battery 7, the contact 13 of the starter relay 12, and the starter motor 8. The starter relay 12 is a so-called normally open type relay that functions as a switch for supplying power to the starter motor 8 by closing the contact 13.

Further, one end of the relay coil 18 of the starter relay 12 is connected to the plus side terminal 11 via the key switch 17 that turns on and off the main power of the two-wheeled motor vehicle. And, the electronic control unit 1 is connected to the other end of the relay coil 18, and the ground 10 is connected to the electronic control unit 1. The second closed circuit 19 is composed of the battery 7, the relay coil 18 and the electronic control unit 1.

As in the first closed circuit 16 described above, the input terminal 23 of a contact 22 of a pump relay 21 that actuates a fuel pump 20 is connected to the plus side terminal 11 of the battery 7. The fuel pump 20 for supplying fuel to the engine under pressure is connected to the output terminal 24 of the contact 22, and the ground 10 is connected to the fuel pump 20. The third closed circuit 25 is composed of the battery 7, the contact 22 of the pump relay 21, and the fuel pump 20. The pump relay 21 is a normally open type relay as in the starter relay 12 described above.

As in the second closed circuit described above, one end of the relay coil 26 of the pump relay 21 is connected to the plus side terminal 11 of the battery 7. And, the electronic control unit 1 is connected to the other end of the relay coil 26. The fourth closed circuit 27 is composed of the battery 7, the relay coil 26 of the pump relay 21, and the electronic control unit 1.

An indicator 28 is connected to the relay coil 18 of the second closed circuit 19 described above and the relay coil 26 of the fourth closed circuit 27 in parallel. The indicator 28, for example, informs a rider of idling stop when stopping the idling. The fifth closed circuit 29 is composed of the battery 7, the indicator 28 and the electronic control unit 1. As in the indicator 28, an ignition (IG) coil 30 that ignites the engine and an injector (INJ) 31 that injects fuel into the combustion chamber are connected to the relay coil 18 and 26 in parallel. The sixth closed circuit 32 is composed of the battery 7, the ignition coil 30, and the electronic control unit 1. The seventh closed circuit 33 is composed of the battery 7, the injector 31 and the electronic control unit 1.

Therefore, the first closed circuit 16 through the seventh closed circuit 33 described above, respectively and individually, are in a drivable state by the electronic control unit 1, and each can be driven by the electronic control unit 1.

Figure 2:
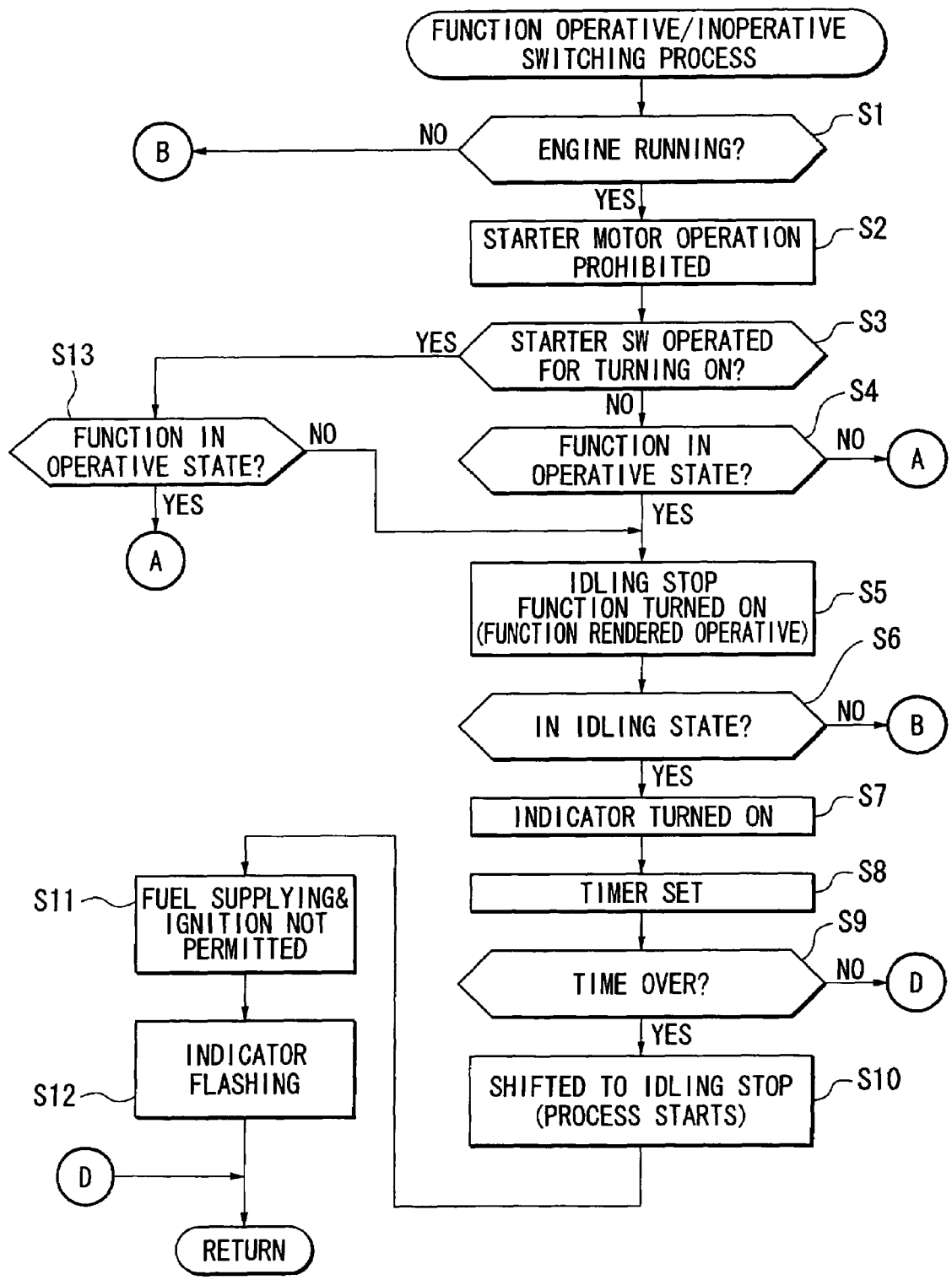
FIG. 2 is a flowchart of a process for switching operativity and inoperativity of the function of the idling stop control apparatus according to the present invention.
Figure 3:
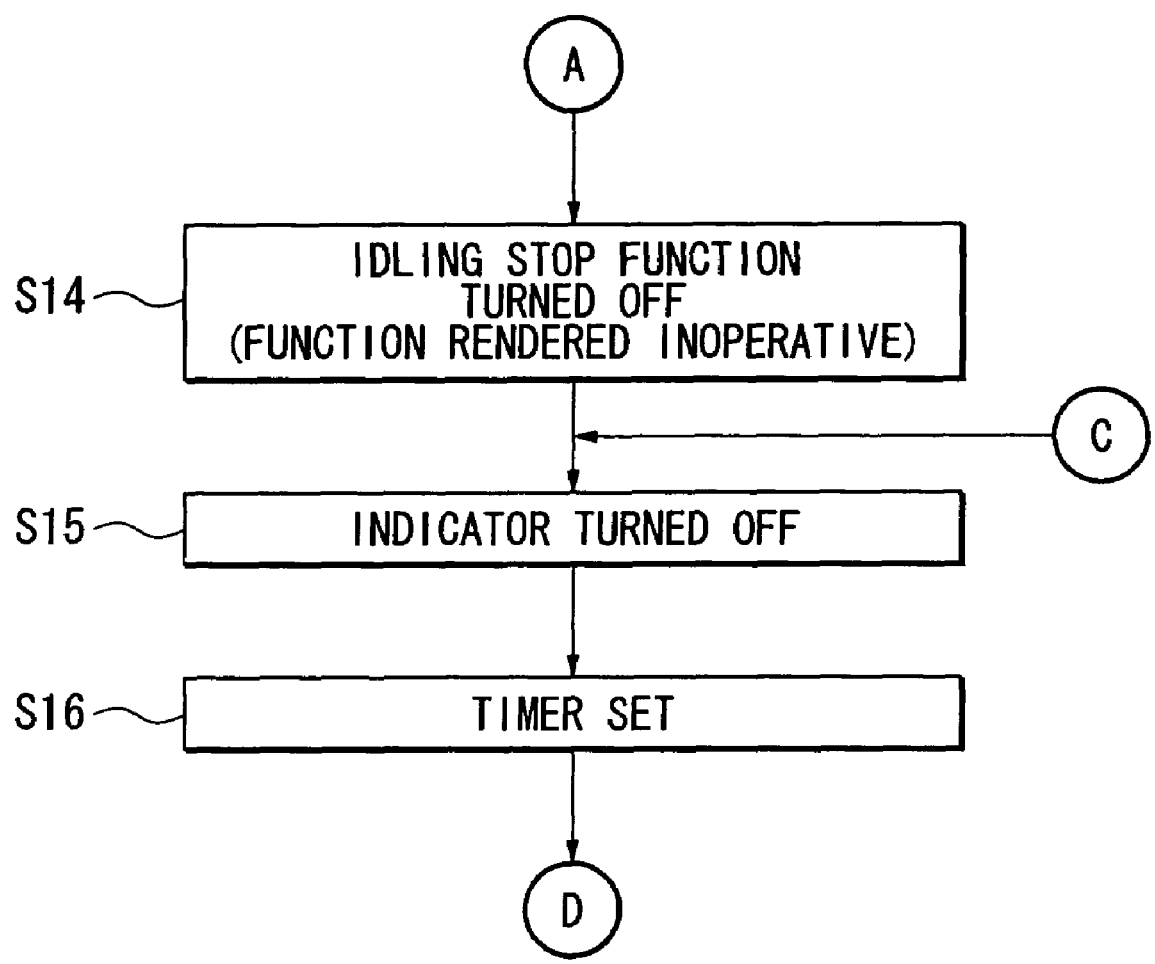
FIG. 3 is a flowchart of a process for switching operativity and inoperativity of the function of the idling stop control apparatus according to the present invention.
Figure 4:
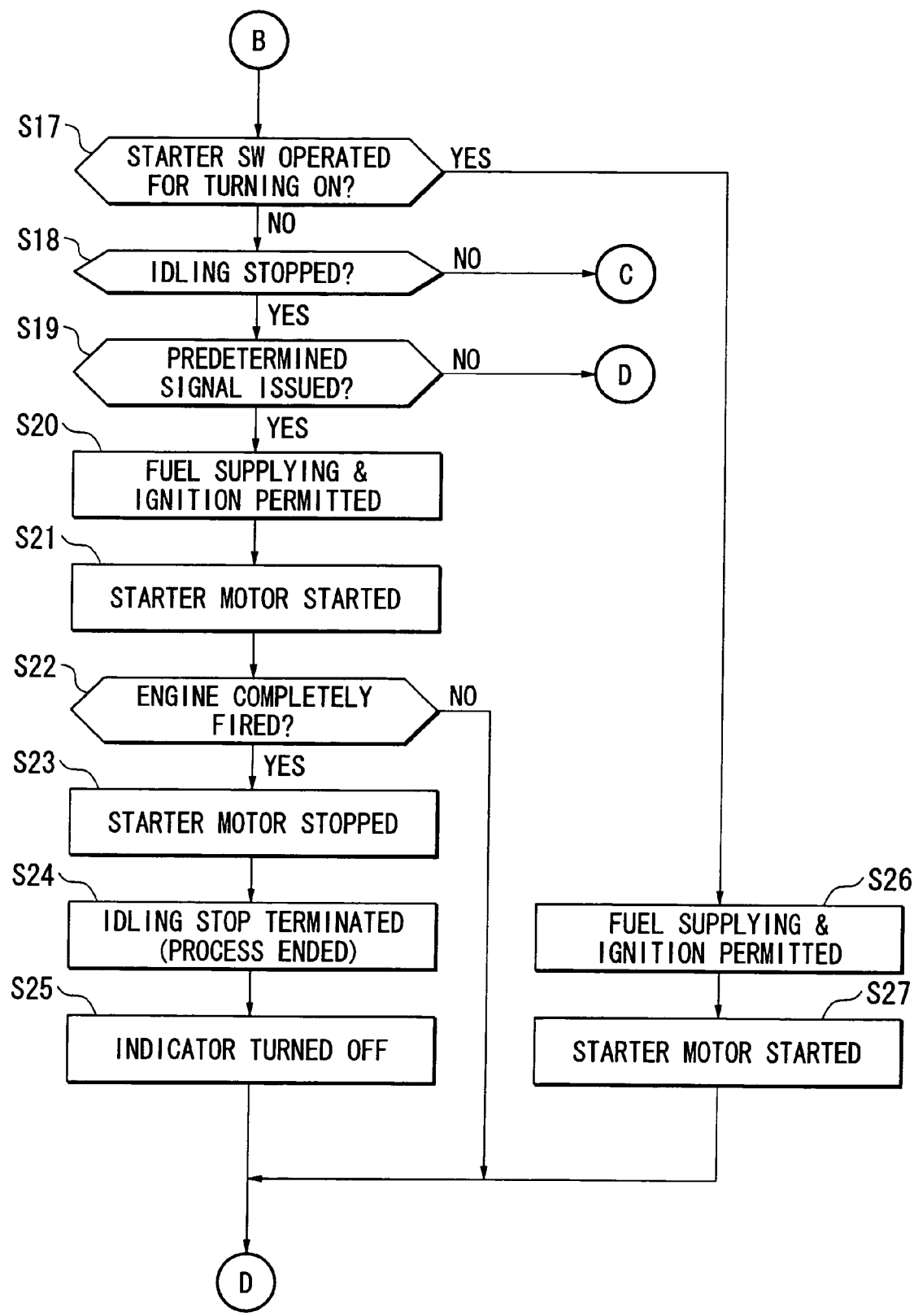
FIG. 4 is a flowchart of a process for switching operativity and inoperativity of the function of the idling stop control apparatus according to the present invention.

Next, a description is given of an operativity and inoperativity switching process of the idling stop function on the basis of the flowcharts of FIG. 2 trough FIG. 4.

First, in step S1, the electronic control unit determines whether the engine is running. When the determination result is "YES" (during running), the process advances to step S2 (starter motor operation prohibiting device). If the determination result is "NO" (not during running), the process advances to step S17. In step S1, when rotation of the crankshaft is detected by the crankshaft angle sensor connected to the electronic control unit and negative pressure in the air intake tube is detected by the air intake sensor, the electronic control unit determines the engine is running.

The electronic control unit prohibits operation of the starter motor in step S2, and shifts to step S3 (switch status determination device). In step S3, the electronic control unit determines whether the starter switch (SW) is turned on. When the determination result is "YES" (turning on operation is being carried out), the process advances to step S13 (idling stop function determination device). When the determination result is "NO" (no turning on operation being carried out), the process advances to step S4. In step S4 (idling stop function determination device), the electronic control unit determines whether the idling stop function is operative or inoperative. When the determination result is "YES" (function is in an operative state), the process advances to step S5 (idling stop function rendering operative device). When the determination result is "NO" (function is in an inoperative state), the process advances to step S14.

In step S5, the electronic unit turns on the idling stop function, and shifts to step S6. In step S6 (idling state determination device), the electronic control unit determines whether the engine is idling. When the determination result is "YES" (engine is idling), the process advances to step S7. When the determination result is "NO" (engine is not idling), the process advances to step S15. Herein, as in the process of step S1, the electronic control unit determines that the engine is idling where the number of revolutions of the engine is detected by the crankshaft angle sensor on the basis of the number of revolutions of the crankshaft, and for example, the number of revolutions of the engine is less than and including the threshold value of the number of idling revolutions.

In step S7, the electronic control unit turns on the indicator and sets the timer in the next step S8. Then, the process advances to step S9. In step S9, the electronic control unit determines whether the time set in the timer is over. When the determination result is "YES" (the time is over), the process advances to step S10, and when the determination result is "NO" (the time is not over), the process makes a return.

In step S10, the electronic control unit shifts to an idling stop (process commencement), and in step S11, stops fuel supplying and prohibits ignition. In step S12, the indicator is caused to flash, and the process makes a return.

In step S13 (idling stop function determination device), the electronic control unit determines whether the idling stop function is in an operative state. When the determination result is "YES" (the function is operative), the process advances to step S14 (idling stop function rendering inoperative device), and when the result is "NO" (the function is inoperative), the process advances to step S5 described above.

In step S14, the electronic control unit turns off the idling stop function, and turns off the indicator in step S15 (indicator turning off). In step S16, the timer is set, and the electronic control unit makes a return.

In step S17 (switch status determination device), the electronic control unit determines whether a turning on operation of the starter switch (SW) is carried out. When the determination result is "YES" (a turning on operation is carried out), the process advances to step S26, and when the result is "NO" (No turning on operation is carried out), the process advances to step S18. In step S18, the electronic control unit determines whether the engine is idling. When the determination result is "YES" (the engine is idling), the process advances to step S19, and when the result is "NO" (the engine is not idling), the process advances to step S15, wherein the process described above is repeated.

In step S19, the electronic control unit determines whether a predetermined operation signal is being issued. When the determination result is "YES" (the signal is being issued), the process advances to step S20, and when the result is "NO" (no signal is being issued), the process makes a return. In step S20, the electronic control unit permits fuel supplying and ignition, and in step S21, starts the starter motor.

In step S22, the electronic control unit determines whether the engine completely fires. When the determination result is "YES" (complete firing), the process advances to step S23, and when the result is "NO" (not complete firing), the process makes a return. In step S23, the electronic control unit stops the starter motor, and, in step S24, terminates an idling stop. In step S25 (indicator turning off), the electronic control unit turns off the indicator and makes a return. Herein, "complete firing" means that the engine reaches the number of revolutions at which the engine is voluntarily caused to run.

In step S26, the electronic control unit permits fuel supplying and ignition, and shifts to step S27. In step S27, the electronic control unit starts the starter motor and makes a return.

That is, when a rider rides a two-wheeled motor vehicle, starts the engine using the starter switch, commences normal running, and the two-wheeled motor vehicle stops due to a traffic signal or due to a traffic jam, an idling state is detected (step S6). For example, in a case of a running state where stopping and starting are frequently repeated, idling stop and re-starting are frequently repeated. Therefore, effects of improvement in fuel consumption and a reduction of exhaust gas are reduced, and extra burden is applied on the battery which is a power source of the starter motor.

With respect to the idling stop function, a state when the rider rode the last time is continued as it is. For example, when the idling stop function is in an operative state ("YES" in step S4 and "NO" in step S13), the indicator is turned on after detecting an idling state, and the rider is informed that the idling is to be stopped (step S7). When the rider intends to inoperative the idling stop function due to the reasons described above and turns on the starter motor while the indicator is lit ("YES" in step S3), only the idling stop function is shifted from its operative state to its inoperative state and the starter motor is not started (step S14). Therefore, it is possible to select an inoperative state of the idling stop function using the starter switch as per the intention of the rider.

In addition, when the rider does not operate the starter switch ("NO" in step S3) while the indicator is lit, and a predetermined duration of time elapses ("YES" in step S9), the engine shifts to an idling stop state (step S10), and the indicator is changed from lighting to flashing (step S12). Therefore, the rider is able to recognize that the engine has shifted to an idling stop.

On the other hand, when an inoperative state of the idling stop function was selected during the last riding time ("NO" in step S4), the indicator is not turned on, as described above, even if the two-wheeled motor vehicle stops due to a traffic signal or a traffic jam and an idling state is detected, and the engine does not shift to an idling stop state. And, when the indicator is turned off in an idling state, the rider is able to recognize that the idling stop function is in an inoperative state. At this moment, if the rider turns on the starter switch ("YES" in step S3 and "NO" in step S13) because he/she intends to render operative the idling stop function, the idling stop function is shifted from an inoperative state to an operative state (step S5). At this time, since the indicator is turned on, the rider is able to recognize when the engine shifts to an idling stop. If the rider operates the starter switch again within a predetermined duration of time, that is, while the indicator is lit, the idling stop function is shifted from an operative state to an inoperative state, and the indicator is turned off.

If the engine is in an idling stop ("YES" in step S18) and the rider carries out a predetermined operation such as an accelerator operation to re-start the engine ("YES" in step S19), the starter motor is automatically started (step S21), and engine cranking is carried out. When the engine completely fires ("YES" in step S22), the starter motor stops its operation (step S23). Further, when the rider manually operates the starter switch voluntarily without making the predetermined operation ("YES" in step S17), re-starting of the engine based on the predetermined operation is cancelled for only this time, and a re-starting process is enabled only for manual operation of the starter switch as in normal starting of the engine.

Therefore, according to the embodiment described above, effectively utilizing the starter switch 6, it becomes possible to switch the idling stop function from an operative state to an inoperative state in step S14, and to switch the idling stop function from an inoperative state to an operative state in step S5. Therefore, since there is no need to provide a switch exclusively for switching the status of the idling stop function, the components required for the special switch can be omitted, and it is possible to decrease costs.

In addition, by causing the indicator 28 to be turned off in step S15, it is possible to cause a rider to recognize that the present idling stop function is in an inoperative state. Therefore, the rider can select an operative state or an inoperative state of the idling stop function as per the intention of the rider, and it is possible to relieve burden on the rider.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not considered as being limited by the foregoing description, and is only limited by the scope of the appended claims.

For example, an idling stop control apparatus according to the present invention may be applicable to a vehicle such as an automobile capable of automatically stopping its engine. Also, when a turning off operation made by a driver/rider is detected, the idling stop function may be made effective by using the starter switch that is normally turned on. Further, indicator may not be limited to the indicator, but may be based on, for example, sound, vibration, etc., to inform a driver/rider of the idling stop.

What is claimed is:

1. An idling stop control apparatus, equipped in an internal combustion engine, having an idling stop function, and being capable of switching the idling stop function to an operative state or an inoperative state, the idling stop control apparatus comprising:
    a starter motor operation prohibiting device which prohibits an operation of a starter motor when it is determined that the internal combustion engine is running;
    an idling state determination device which determines whether the internal combustion engine is idling;
    an idling stop function determination device which determines whether the idling stop function is in an operative state or in an inoperative state;
    a switch status determination device which determines a turning on operation of the starter switch;
    an indicator which gives an idling stop indication when the internal combustion engine shifts to an idling stop state; and
    an idling stop function rendering inoperative device which switches the idling stop function from an operative state to an inoperative state, when the idling state determination device determines that the internal combustion engine is running, and when the switch status determination device determines that the starter switch is turned on.

2. The idling stop control apparatus according to claim 1, further comprising: an idling stop function rendering operative device which switches the idling stop function from an inoperative state to an operative state, in a state where it is determined that the internal combustion engine is running and the operation of the starter motor is prohibited, when the idling stop function determination device determines that the idling stop function is in an inoperative state and when the switch status determination device determines that the starter switch is turned on.

3. The idling stop control apparatus according to claim 1, further comprising: an indicator turning off device which turns off the indicator when the idling stop function rendering inoperative device switches the idling stop function from an operative state to an inoperative state.

4. The idling stop control apparatus according to claim 2, further comprising: an indicator turning off device which turns off the indicator when the idling stop function rendering inoperative device switches the idling stop function from an operative state to an inoperative state.

* * * * *